No. 828,445. PATENTED AUG. 14, 1906.
J. WARES & A. HOLMAN.
FAUCET.
APPLICATION FILED JAN. 2, 1906.
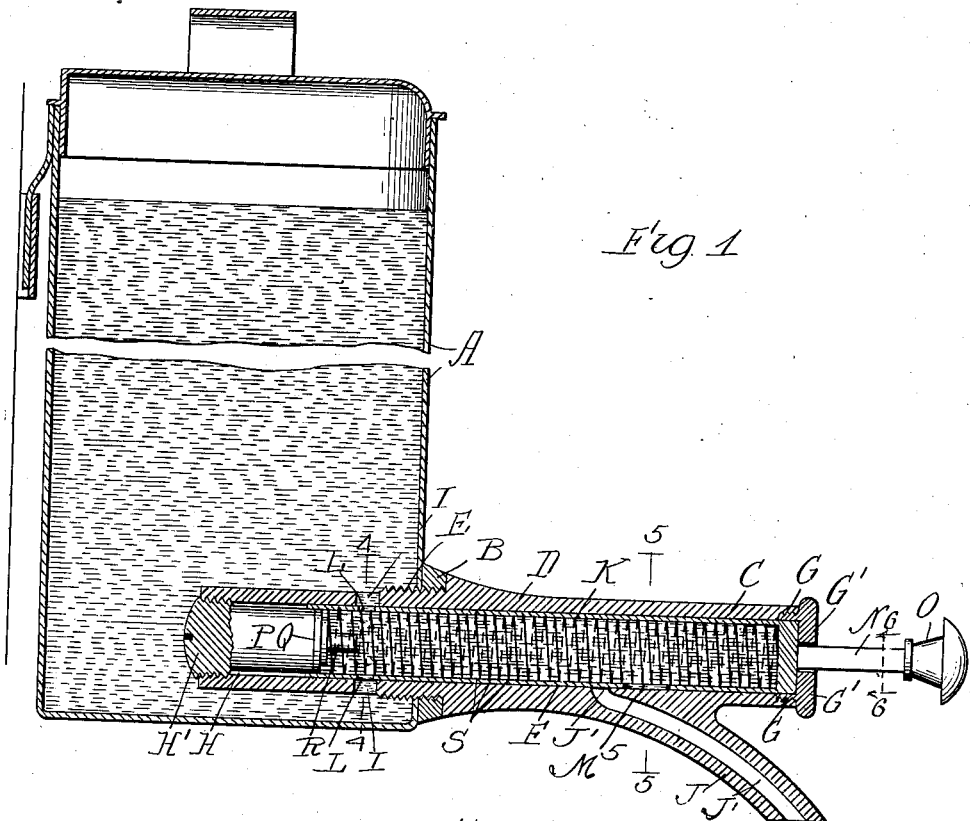
Fig. 1
Fig. 2
Fig. 3
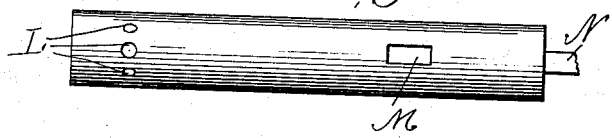
Fig. 6
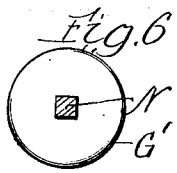
Fig. 4
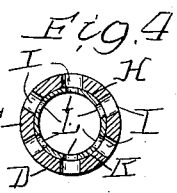
Fig. 5
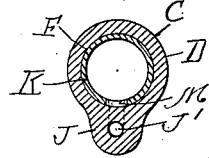
Witnesses
Ray White
Harry R. Linhute
Inventors
James Wares
Adolph Holman
By Morgan & Rubinstein Attys

UNITED STATES PATENT OFFICE.

JAMES WARES AND ADOLPH HOLMAN, OF CHICAGO, ILLINOIS.

FAUCET.

No. 828,445.  Specification of Letters Patent.  Patented Aug. 14, 1906.

Application filed January 2, 1906. Serial No. 294,184.

*To all whom it may concern:*

Be it known that we, JAMES WARES, residing at 233 Watt street, and ADOLPH HOLMAN, residing at 3104 Fox street, in the city of Chicago, county of Cook, and State of Illinois, citizens of the United States, have invented a new and useful Improvement in Faucets, of which the following is a specification.

Our improvement relates particularly to that class of faucets used in public places for drinking, washing, and other purposes.

The object of our invention is to provide a faucet that will prevent waste by limiting the quantity of liquid passing from it each time it is opened, to prevent waste by making it impossible for users to leave it open, to prevent contagion when the liquid passing through the faucet is used for washing purposes by limiting contact with the material, such as soap, used to the individual using it.

The manner in which we accomplish our object is explained in the following specification and illustrated in the accompanying drawings, in which—

Figure 1 is a central vertical sectional view showing the faucet in place in the supply-tank. Fig. 2 is a top plan view of the slide-valve, showing the inlet-apertures. Fig. 3 is an underneath plan view showing the inlet and outlet apertures. Fig. 4 is a cross-sectional view on the line 4 4, Fig. 1. Fig. 5 is a cross-section through the line 5 5, Fig. 1. Fig. 6 is a sectional view on the line 6 6, Fig. 1, showing a cross-section of the rod and plan view of the cap.

In the drawings, A is a tank adapted to hold a supply of liquid. In the lower part of this tank is a threaded bushing B. Supported in this bushing is a faucet C. The body D of this faucet is proportioned in size and shape to the particular place and use for which it is required. On the part of the faucet within the tank are suitable threads E, adapted to fit the bushing and permit the ready detachment of the faucet from the tank for cleaning and other purposes. Extending longitudinally through the body of the faucet is a finished cylinder F, having threaded ends G and H. Secured in these ends are a cap G' and a ram H'. Near the threaded part E of the faucet are several apertures I, which extend through the body of the faucet into the cylinder. These form inlets through which the liquid in the tank passes into the faucet. Extending through the body D and spout J is an aperture J', through which the liquid passes out of the faucet. Fitting this cylinder F and adapted to slide therein is a hollow valve K. In this valve are several apertures L, which register with the apertures I in the main body and form inlets for the passing of the liquid into the valve when the faucet is closed. In the under side near the center of the length of the valve is an oblong aperture M, adapted to register with the aperture J', forming an outlet into the spout, through which the liquid passes from inside the valve when the faucet is opened. Extending from the closed end of the valve and through the cap G' is a valve-stem N. This stem is angular in section, and the aperture in the cap is adapted to fit it, and thereby prevents any rotary motion of the valve, and thus preserves the registration of the apertures in the valve and main body. On the end of this stem is a push-button O. In the other end of the cylinder F a ram H' is affixed. A part P of this ram is provided with a packing-ring Q, adapted to fit inside the end of the valve K. The end R of the ram is adapted to hold the end of a spring S. This spring is inclosed in the valve K and is compressed between the bottom of the valve and the end of the ram and is adapted to hold the valve in the normal closed position in the faucet.

When the faucet is constructed as described, and illustrated in the drawings, and secured in the tank, the spring holds the valve in the closed position, as shown in Fig. 1. In that position the outlet M in the valve and outlet J' in the main body are closed and the inlets L in the valve register with those in the main body inside the tank through which the liquid flows into and fills the valve K. Pressure on the push-button moves the valve in toward the tank, compressing the spring S and closing the inlets L. When these are closed, as the movement of the valve continues the outlet M registers with the outlet J', and the pressure of the ram on the liquid in the valve as the end of the valve moves over the ram forces the liquid out through the spout. When the pressure on the push-button is removed, the spring forces the valve back to its normal closed position, where it is filled again by the natural flow of the liquid from the tank through the inlets L.

It is obvious that the quantity of liquid forced through the faucet each time it is opened can be determined by adjusting the length and diameter of the valve and by the length of the ram and the distance the valve moves over it.

We do not wish to be restricted to the circular form of the cylinder and valve, to the square valve-stem, or to the number of apertures forming the inlets, as changes in construction in these particulars will not affect the operation of the faucet.

What we claim as new, and desire to secure by Letters Patent, is—

1. In combination with a suitable tank provided with a threaded bushing adapted to support a faucet; a faucet having a threaded part adapted to fit said bushing and support said faucet in said tank; said faucet consisting of a main body adapted to project partly within and partly without said tank, the interior of said body forming a cylinder extending the full length thereof, said cylinder having a plurality of inlets connecting said cylinder with the interior of said tank, and an external outlet extending from said cylinder through a spout outside said tank; a supply-valve inclosed in said cylinder and adapted to slide back and forth therein, said valve being hollow and pierced with apertures adapted to register alternately with the inlets and the outlet in said cylinder, said valve having a valve-rod at one end, adapted to slide through a cap, said cap being secured in the external end of said cylinder; a button secured on the end of said rod; a ram secured in the internal end of said cylinder, said ram having a packing attached thereto, said ram and packing being adapted to slide inside the end of said valve; and a spring inclosed inside said valve, said spring being compressed between the bottom of said valve and the end of said ram.

2. In a faucet adapted to be inserted in a supply-tank, the combination with a main body, having an interior cylinder extending through its entire length, said cylinder having inlets through said body adapted to admit fluid from said supply-tank, and an outlet from said cylinder through a spout forming part of said body; of a hollow supply-valve inclosed in said cylinder, and adapted to be moved longitudinally therein, said valve having apertures adapted to register alternately with said inlets and outlet in said main body, and a valve-rod and push-button whereby said valve may be moved; and a ram affixed in the tank end of said faucet having a packing, said ram and packing being adapted to slide in the open end of said valve; and a spring inclosed in said valve, said spring being compressed between the bottom of said valve and end of said ram; and a cap adapted to close the end of said cylinder and to guide said valve-rod extending therethrough, substantially as described and for the purposes specified.

3. A faucet adapted to be connected with a supply-tank, said faucet consisting of the several parts and combinations of parts, to wit: a main body having a finished interior extending through the length of said body, said body being pierced with apertures forming inlets for the passage of fluid into said interior, and an aperture forming an outlet for the passage of fluid from said interior through a spout forming part of said body; and a hollow slide-valve adapted to be inclosed in said interior of said main body and to be moved therein, said valve having apertures adapted to register with the apertures in said main body forming inlets into and an outlet from said valve, for the passage of fluid; and means for moving said valve in said body and thereby opening and closing said inlets and outlet; and a ram secured in one end of said main body, said ram being adapted to enter the open end of said valve when said valve is moved; and a spring inclosed in said valve, said spring being compressed between the bottom of said valve and the end of said ram, substantially as described and for the purposes specified.

4. A faucet adapted to regulate the quantity of fluid each time said faucet is opened, said faucet consisting of a longitudinal hollow body adapted to be connected with a supply-tank, said body having an inlet and an outlet for the passage into and from said main body; and a hollow slide-valve inclosed inside said main body and adapted to be moved therein, said valve having an inlet and outlet for the passage of fluid, the said apertures being arranged to register with the apertures in said main body; and a ram affixed in said main body adapted to enter the interior of said valve and to thereby force the fluid therein out through said outlet in said valve and in said body; and means for operating said valve and for closing said valve and holding it in a normal position of rest, substantially as described and for the purposes specified.

JAMES WARES.
ADOLPH HOLMAN.

Witnesses:
JOSEPH STAAB,
THOMAS J. MORGAN.